(12) United States Patent
Mizukoshi

(10) Patent No.: US 8,837,286 B2
(45) Date of Patent: Sep. 16, 2014

(54) COMMUNICATION SYSTEM, FLOW CONTROL DEVICE, FLOW TABLE UPDATING METHOD, AND PROGRAM

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 127 days.

(21) Appl. No.: 13/178,287

(22) Filed: Jul. 7, 2011

(65) Prior Publication Data
US 2011/0310734 A1 Dec. 22, 2011

Related U.S. Application Data

(63) Continuation of application No. PCT/JP2010/068154, filed on Oct. 15, 2010.

(30) Foreign Application Priority Data

Oct. 19, 2009 (JP) ................................. 2009-240410

(51) Int. Cl.
*G01R 31/08* (2006.01)
*H04L 12/28* (2006.01)
*H04L 12/717* (2013.01)
*H04L 12/725* (2013.01)
*H04W 40/34* (2009.01)

(52) U.S. Cl.
CPC ............... *H04L 45/42* (2013.01); *H04L 45/306* (2013.01); *H04W 40/34* (2013.01)
USPC .......................................... 370/231; 370/389

(58) Field of Classification Search
USPC ....................................................... 370/231
See application file for complete search history.

(56) References Cited

U.S. PATENT DOCUMENTS

| 6,490,248 B1 | 12/2002 | Shimojo |
| 6,934,296 B2 | 8/2005 | Shimojo |
| 7,508,760 B2 * | 3/2009 | Akiyama et al. ............... 370/232 |

(Continued)

FOREIGN PATENT DOCUMENTS

| JP | 9-149051 A | 6/1997 |
| JP | 2004-248257 A | 9/2004 |
| JP | 2008-067055 A | 3/2008 |

OTHER PUBLICATIONS

Iijima et al., "Sentan Kankyo Gijutsu Cloud Computing Jidai no Data Center to Network no Shoene Gijjutsu", NEC Technical Journal, Sep. 25, 2009, vol. 62, No. 3, pp. 117-120.

(Continued)

*Primary Examiner* — Gerald Smarth
(74) *Attorney, Agent, or Firm* — McGinn IP Law Group, PLLC

(57) ABSTRACT

A communication system, wherein a switch node to which a terminal is connected can be recognized, and a flow table can be updated promptly in accordance with the status of the switch node. The communication system includes: a switch node that operates in accordance with a flow table in which processing content is defined for each of a plurality of flows, and a flow control device that includes a terminal management unit that records, based on a request to set a flow entry from the switch node, information of association between a terminal of a packet source and a switch node to which the terminal is connected, wherein the flow control device refers to the information of association to make the switch node execute a modification or deletion of a flow entry in the flow table.

15 Claims, 14 Drawing Sheets

(56) References Cited

U.S. PATENT DOCUMENTS

| | | | |
|---|---|---|---|
| 8,139,593 B2* | 3/2012 | Dravida et al. | 370/412 |
| 2001/0028647 A1* | 10/2001 | Teraoka | 370/389 |
| 2003/0193912 A1* | 10/2003 | O'Neill | 370/331 |
| 2004/0044744 A1* | 3/2004 | Grosner et al. | 709/217 |
| 2004/0162113 A1 | 8/2004 | Oomoto et al. | |
| 2005/0220014 A1* | 10/2005 | DelRegno et al. | 370/230 |
| 2007/0110102 A1* | 5/2007 | Yagyuu et al. | 370/470 |
| 2008/0062917 A1 | 3/2008 | Oguchi | |
| 2008/0114887 A1* | 5/2008 | Bryers et al. | 709/230 |
| 2008/0189769 A1* | 8/2008 | Casado et al. | 726/4 |
| 2010/0106866 A1* | 4/2010 | Aybay et al. | 710/29 |

OTHER PUBLICATIONS

Kanaumi et al.,"BS-10-4 JGN2plus-jo deno Open Flow Jissho Jikken", Proceedings of the 2009 IEICE General Conference Tsushin 2, Mar. 4, 2009, pp. S-135-S-136.

N. McKeown et al., "OpenFlow: Enabling Innovation in Campus Networks", Mar. 14, 2008, Internet URL: http://www.OpenFlowswitch.org//documents/OpenFlow-wp-latest.pdf.

* cited by examiner

T1→S1:P1 output P3(4)

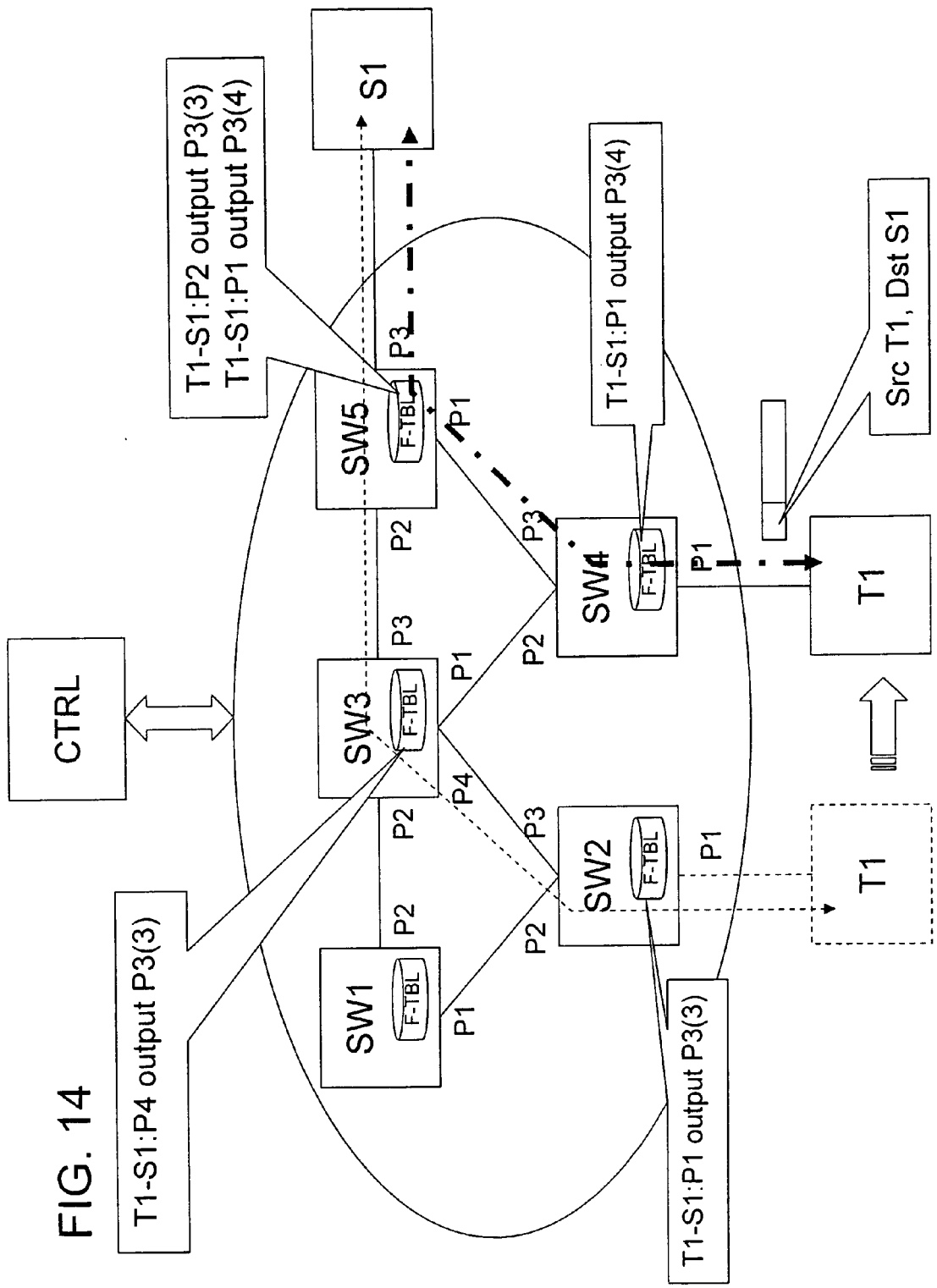

COMMUNICATION SYSTEM, FLOW CONTROL DEVICE, FLOW TABLE UPDATING METHOD, AND PROGRAM

CROSS REFERENCES TO RELATED APPLICATIONS

This application is a continuation of International Patent Application No. PCT/JP2010/068154, filed on Oct. 15, 2010, and claims priority to Japanese Patent Application No. 2009-240410, filed on Oct. 19, 2009, both of which are incorporated herein by reference in their entireties.

TECHNICAL FIELD

The present invention relates to a communication system, a flow control device, a flow table updating method, and a computer program, and relates to a communication system having a flow control device for controlling the behavior of a switch node for forwarding a packet, a flow control device, a flow table updating method, and a computer program.

BACKGROUND

Non-Patent Document 1 proposes technology known as OpenFlow. OpenFlow treats communication as end-to-end flow, and performs path control, malfunction recovery, load balancing, and optimization, in flow units. An OpenFlow switch is provided with a secure channel for communication with an OpenFlow controller, and operates in accordance with a flow table for which appropriate adding or rewriting is instructed by the OpenFlow controller. The flow table records flow entries formed of a set of rules that refer to a packet header, actions that define processing content, and flow statistical formation, for each of a plurality of flows.

For example, when the OpenFlow switch receives a first packet, a search is made for an entry Wow entry) having a rule (Flow Key) that matches header information of the received packet, from the flow table. In a case where, as a result of the search, a flow entry matching the received packet is found, the OpenFlow switch implements processing content described in an action field of the flow entry, with regard to the received packet. On the other hand, in a case where, as a result of the search, a flow entry matching a received packet is not found, the OpenFlow switch forwards the received packet to the OpenFlow controller, via the secure channel, requests a determination of a packet path based on a source and destination of the received packet, receives a flow entry realizing this, and updates the flow table.

Furthermore, although not directly related to the abovementioned OpenFlow, Patent Documents 1 and 2 below were detected and thus are mentioned.

Patent Document 1 discloses a home agent of a mobile communication system based on mobile IP, having an interface means for routing a received packet in accordance with a forwarding table, and a location information management means for managing the forwarding table. The forwarding table held by the home agent in the same document includes at least relationships of association for port numbers distinguishing global IP addresses (HoA) for mobile nodes, and care-of addresses (CoA) for mobile nodes, and applications, and a forwarding destination of a packet received by the home agent is differentiated by a combination of the CoA and port number. In the document, each of a plurality of mobile nodes is configured to detect when one or more of the HoA, CoA, and port number of the node itself has changed, and to report to the home agent.

Patent Document 2 discloses a packet buffer device that uses a flow table to perform weighted fair queuing among flows.

[Patent Document 1]
Japanese Patent Kokai Publication No. JP 008-067055A
[Patent Document 2]
Japanese Patent Kokai Publication No. JP-A-09-149051
[Non-Patent Document 1]
Nick McKeown, and 7 others, "OpenFlow: Enabling Innovation in Campus Networks", [online], [search conducted Oct. 15, 2009]
Internet URL: http://www.OpenFlowswitch.org//documents/OpenFlow-wp-latest.pdf

SUMMARY

The entire disclosures of the abovementioned Patent Documents and 2, and Non-Patent Document 1 are incorporated herein by reference thereto. The following analysis is given by the present invention. In Example 3 of Non-Patent Document 1 as described above, there is a description that OpenFlow technology can also be applied to mobile wireless VOIP clients. According to this description, an open flow controller that operates as a flow control device is provided with a function for following the movement of a terminal and, by updating a flow table as described above, re-setting of a path is performed.

As shown in FIG. 8, operation of Example 3 of Non-Patent Document 1 is described using a configuration of a plurality of switch nodes SW1 to SW5 corresponding to OpenFlow switches, and a flow control device CTRL corresponding to the OpenFlow controller. It is to be noted that P1 to P4 in the drawing are symbols for identifying ports of respective switch nodes.

Here, a case is considered, as shown in FIG. 9, where a terminal T1 connects to the switch node SW2 and attempts to communicate with a server S1. The switch node SW2 extracts a flow type (flow characteristic) of a packet having the server S1 as a destination transmitted by the terminal T1. Here, what is extracted is a packet that has not matched a flow entry recorded in a flow table of SW1, and targets are mainly ARP (Address Resolution Protocol) packets, TCP (Transmission Control Protocol) SYN packets, or a first UDP packet having a specific IP (Internet Protocol) address and a specific port number.

As shown in FIG. 10, the switch node SW2 makes an enquiry concerning the flow in question, with respect to the flow control device CTRL, makes a judgment as to whether or not packet forwarding is possible, requests a determination of a path where forwarding is possible, receives a flow entry realizing this, and updates the flow table. Here, in the flow control device CTRL, a judgment is made that there is a path by which the packet in question can be forwarded, and a forwarding path in the order of the switch node SW2, the switch node SW3, and the switch node SW5 is set. In this case, an instruction is given to the switch node SW2 to add a flow entry that determines an action to output a packet of the flow type in question from port P3 that is connected to the switch node SW3. "T1-S1: P1 output P3(4)" in FIG. 10 is a simplified flow entry, and indicates that a packet to the server S1 from the terminal T1 received from port P1 is outputted from port P3 (for a specific example, refer to Table 1 of Non-Patent Document 1). Furthermore, the numerical value "4" in parentheses denotes a period of validity (seconds) of the flow entry in question, and in a case where a matching packet has not been received within the period, it is assumed that management is performed by a soft-state method so that the flow entry in question is deleted.

As shown in FIG. 11, in the same way for switch node SW3 and switch node SW5, an enquiry is made to the flow control device CTRL concerning the flow in question, and a flow entry that realizes a path of the switch node SW2, the switch node SW3, and the switch node SW5, is set.

As a result of the above, as shown in FIG. 12, by the flow entry being added to flow tables of the switch node SW2, the switch node SW3, and the switch node SW5, thereafter a packet matching the flow entry in question is handled through a path of the switch node SW2, the switch node SW3, the switch node SW5, and the server S1.

Thereafter, in a case where the terminal T1 moves and connects with the switch node SW4 to transmit a packet, as shown in FIG. 13, the switch node SW4 and the switch node SW5 respectively make enquiries concerning the flow in question to the flow control device CTRL, and a flow entry realizing a path of the switch node SW4 and the switch node SW5 is added.

A first problem with an updating method for a flow table as described above is that, in spite of the fact that communication does not take place, the flow entry remains for a certain period in the switch nodes SW2, SW3, and SW5, and there is a possibility of a flow loophole. For instance, an example in FIG. 14 shows a state of setting a new path via the switch nodes SW4 and SW5, one second after re-updating a path via the switch nodes SW2, SW3 and SW5. The flow entry of the switch nodes SW2, SW3, and SW5 is not deleted until 3 seconds have elapsed.

A second problem with the updating method of the flow table as described above, as shown in the switch node SW5 of FIG. 14, resides in that there is a possibility that a switch node in a duplicated space in a path before or after moving, forwards a packet in a path that is not used any more. It results in that this state also continues for 3 seconds. It is to be noted that in OpenFlow, setting a duplicated path is not a problem of itself, since a redundant configuration is enabled for transmitting by another path a packet with a certain terminal destination. Here, the problem is that there remains a path that does not contribute to redundancy.

Furthermore, there is a possibility that a flow entry remaining in the flow table for a certain period may become a security hole.

It is expected that each of the abovementioned problems will become all the more pronounced in a state where terminals move about, or in a state where a plurality of terminals are connected and move. If a state occurs where respective unnecessary flow entries are stored in multiple switch nodes, response performance of the respective switch nodes will clearly affect performance of the overall communication system.

The present invention has been achieved in view of the abovementioned situation, and it is an object thereof to provide a communication system, a flow control device, a flow table updating method, and a computer program, wherein a switch node to which a terminal is connected can be recognized and a flow table can be promptly updated in accordance with the status of the switch node.

According to a first aspect of the present invention, there is provided a communication system comprising: a switch node that operates in accordance with a flow table in which processing content is defined for each of a plurality of flows; and a flow control device that includes a terminal management unit that records, based on a request to set a flow entry from the switch node, information of association between a terminal of a packet source and a switch node to which the terminal is connected. The flow control device refers to the information of association to make the switch node execute a modification or deletion of a flow entry in the flow table.

According to a second aspect of the present invention, there is provided a flow control device, connected to a switch node that operates in accordance with a flow table in which processing content is defined for each of a plurality of flows, the flow control device being provided with a terminal management unit that records, based on a request to set a flow entry from the switch node, information of association between a terminal of a packet source and a switch node to which the terminal connected. Reference is made to the information of association to make the switch node execute a modification or deletion of a flow entry in the flow table.

According to a third aspect of the present invention, there is provided a flow table updating method in a communication system including a switch node that operates in accordance with a flow table in which processing content is defined for each of a plurality of flows: and a flow control device that controls a switch node by updating the flow table in the switch node. The method includes: recording, based on a request to set a flow entry from the switch node, information of association between a terminal of a packet source and a switch node to which the terminal is connected; and referring to the information of association to make the switch node execute a modification or deletion of a flow entry in the flow table. The present method is linked with specific apparatuses, known as a switch node and a flow control device that controls a switch node.

According to a fourth aspect of the present invention, there is provided a program for a communication system that includes a switch node that operates in accordance with a flow table in which processing content is defined for each of a plurality of flows; and a flow control device that controls a switch node by updating the flow table in the switch node. The program executes, in a computer including a flow control device, a process of recording, based on a request to set a flow entry from the switch node, information of association between a terminal of a packet source and a switch node to which the terminal is connected, and a process of referring to the information of association to instruct the switch node to execute a modification or deletion of a flow entry in the flow table. It is to be noted that that the program can be recorded on a computer readable storage medium. In other words, the present invention can be embodied as a computer program product.

The meritorious effects of the present invention are summarized as follows without limitation.

According to the present invention, it is possible to promptly cancel a state in which a flow entry of little necessity remains in flow tables of respective switch nodes. A reason for this is that a configuration is adopted in which a flow control device is made to recognize relationships of association between a terminal at a packet source that is a flow starting point, and a switch node, and to instruct the switch node(s) to perform updating of the flow table(s).

BRIEF DESCRIPTION OF THE DRAWINGS

FIG. 14 is a continuation diagram of FIG. 13.

PREFERRED MODES

Figure 1:
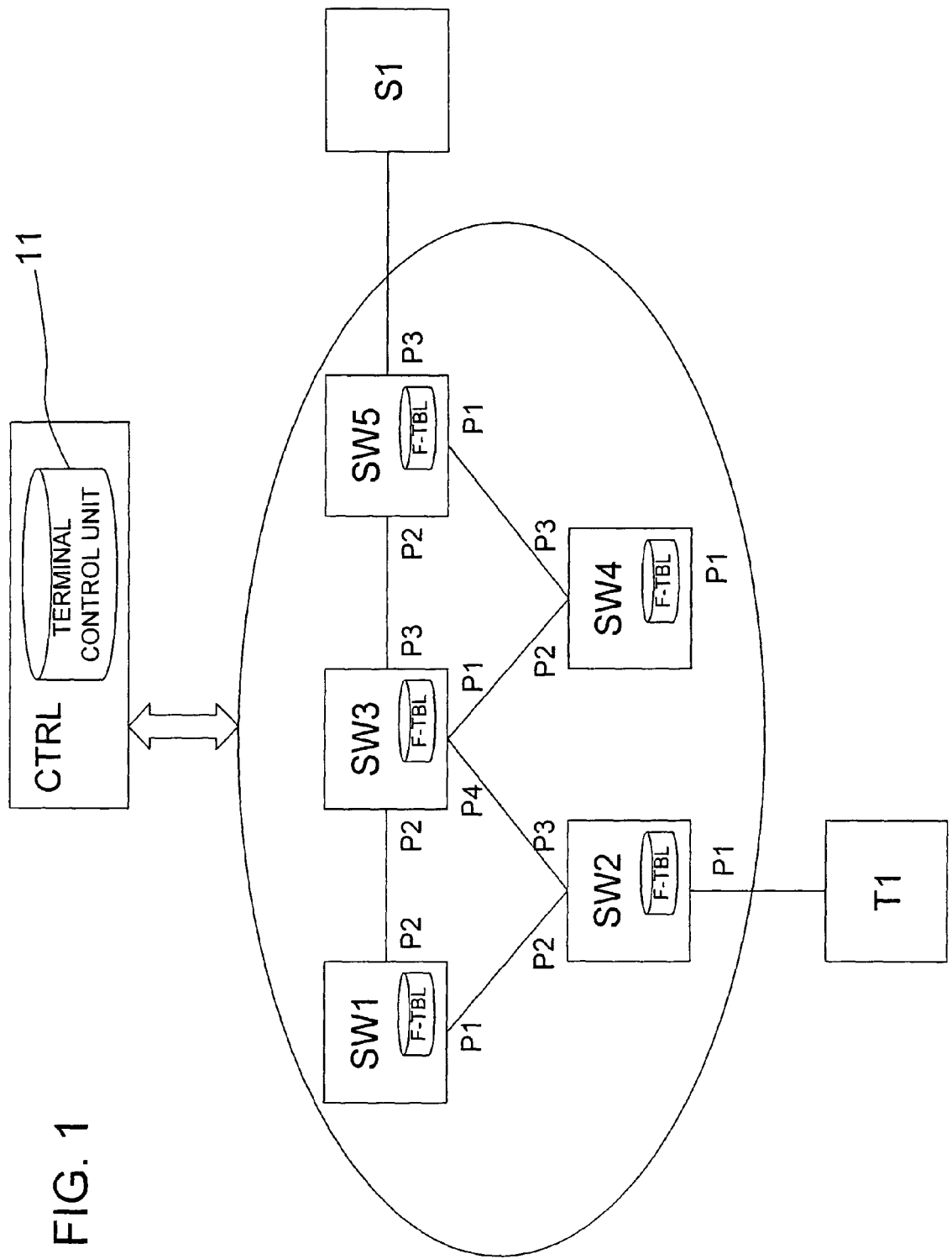
FIG. 1 is a diagram representing a configuration of a communication system of a first exemplary embodiment of the present disclosure.

First, a description is given of an outline of preferred mode of the present invention. As shown in FIG. 1, the present invention can be applied to a configuration having a plurality of switch nodes SW1 to SW5 that operate in accordance with flow tables in which processing content is defined for each of a plurality of flows, and a flow control device CTRL for central control of these switch nodes SW1 to SW5. It is to be noted that the example of FIG. 1 shows 5 switch nodes SW1 to SW5, but the number of switch nodes is not particularly limited. Furthermore, drawing reference symbols described in this outline are shown solely as examples in order to assist understanding, and are not intended to limit to embodiments of the drawings.

When there is no flow entry matching a received packet in flow tables of the respective switch nodes, the switch nodes request creation (setting) of a flow entry defining processing content for the packet in question, with respect to the flow control device CTRL, in addition to information of the received packet.

The flow control device CTRL, which receives the request, records, in a terminal management unit 11, information of association between a source terminal of the packet in question and a switch node to which the terminal in question is connected. In addition, the flow control device CTRL uses path topology information held separately to create a forwarding path of the packet in question that has been received from the switch node and a flow entry realizing this, and responds to the switch node. In addition, the flow control device CTRL refers to the information of association to execute deletion of flow entries from the flow tables of other switch nodes, as necessary. For example, flow entries of "T1-S1: P1 output P3(4)". "T1-S1: P4 output P3(4)", and "T1-S1: P1 output P3(4)" are deleted before movement of the terminal T1, with regard to the switch nodes SW2, SW3, and SW5 that have flow entries concerning flow from the same terminal T1 in FIG. 14. It is to be noted that instead of deleting the flow entry in switch node SW5, it is possible to employ a method of modifying the flow entry of "T1-S1: P1 output P3(4)" to "T1-S1: P2 Output P3(4)".

From the above, even in a state where the terminal moves about, it is possible to recognize a switch node that is connected therein, and to add, modification, or delete a flow entry as appropriate, without waiting for deletion of a flow entry in accordance with a soft state. In the present invention the following modes are possible.

[Mode 1]
As in the communication system according to the first aspect.
[Mode 2]
When a change is detected in a switch node to which a terminal is connected, the flow control device preferably makes each switch node delete a flow entry that has been set for the terminal in question.

[Mode 3]
The terminal management unit additionally makes an association in port information of a connected switch node for each of a plurality of terminals, to be stored, and when a change is detected in a port to which a terminal is connected, the flow control device preferably makes each switch node delete a flow entry that has been set for the terminal in question.
[Mode 4]
When a change is detected in a port or a switch node to which a terminal is connected, it is preferable that the flow control device makes each switch node delete a flow entry that has been set for the terminal in question, and then instructs each of the switch nodes to add a new flow entry for the terminal in question.
[Mode 5]
As in a flow control device according to the second aspect.
[Mode 6]
When a change is detected in a switch node to which a terminal is connected, each switch node is preferably made to delete a flow entry that has been set for the terminal in question.
[Mode 7]
The terminal management unit furthermore makes an association in port information of a connected switch node for each terminal, to be stored, and when a change is detected in a port to which a terminal is connected, each switch node is preferably made to delete a flow entry that has been set for the terminal in question.
[Mode 8]
When a change is detected in a port or a switch node to which a terminal is connected, it is preferable that after each switch node is made to delete a flow entry that has been set for the terminal in question, each of the switch nodes is instructed to add a new flow entry for the terminal in question.
[Mode 9]
As in a low table updating method according to the third aspect.
[Mode 10]
When a change is detected in a port to which a terminal is connected, each switch node is preferably made to delete a flow entry that has been set for the terminal in question.
[Mode 11]
In the step of recording information of association between a terminal of a packet source and a switch node to which the terminal is connected based on a request to set a flow entry from the switch node, in addition, an association is made in port information of a switch node to which the terminal is connected, to be stored, and when a change is detected in a port to which a terminal is connected, each switch node is preferably made to delete a flow entry that has been set for the terminal in question.
[Mode 12]
When a change is detected in a port or a switch node to which the terminal is connected, it is preferable that after each switch node is made to delete a flow entry that has been set for the terminal in question, each of the switch nodes is instructed to add a new flow entry for the terminal in question.
[Mode 13]
As in a program according to the fourth aspect.
[Mode 14]
When a change is detected in a port to which a terminal is connected, each switch node is preferably instructed to delete a flow entry that has been set for the terminal in question.
[Mode 15]
In the process of recording information of association between a terminal of a packet source and a switch node to which the terminal is connected based on a request to set a flow entry from the switch node, in addition, an association is made in port information of a switch node to which the terminal is connected, to be stored: and when a change is detected in a port to which a terminal is connected, each switch node is preferably instructed to delete a flow entry that has been set for the terminal in question.

In the following preferred modes will be further described in more detail by way of exemplified embodiments with reference to the drawings.

[First Exemplary Embodiment]

Next, a detailed description is given concerning a first exemplary embodiment of the present invention, making reference to the drawings. FIG. 1 is a diagram representing a configuration of a first exemplary embodiment of the present invention. Referring to FIG. 1, switch nodes SW1 to SW5, a flow control device CTRL for central control of these switch nodes SW1 to SW5, a terminal T1, and a server S1 are shown. Reference symbols P1 to P4 in FIG. 1 are port numbers for each switch node to uniquely identify respective input output ports.

The switch nodes SW1 to SW5 are switch nodes that can operate as an OpenFlow switch of Non-Patent Document 1. More specifically, the switch nodes SW1 to SW5 follow an instruction from the flow control device CTRL to execute an addition, a modification, a deletion, or the like, of a flow entry of a flow table.

A function is provided such that, when a packet is received from another node, the switch nodes SW1 to SW5 search for a flow entry matching the received packet, and perform forwarding of the packet in question in accordance with content thereof.

The flow control device CTRL is a central control node corresponding to the OpenFlow controller of Non-Patent Document 1, for performing flow control by making the switch nodes SW1 to SW5, which operate as described above, update the flow tables they respectively hold. With regard to an instruction to update an OpenFlow table, made to the switch nodes SW1 to SW5, it is possible to use a method of interaction with an OpenFlow protocol via a secure channel as in Non-Patent Document 1.

Furthermore, the flow control device CTRL of the present exemplary embodiment is provided with a terminal management unit 11 that records information of association between a terminal and a switch node to which the terminal is connected, and when an instruction, such as a correction of a flow table, is given to the above described switch nodes SW1 to SW5, the flow control device CTRL refers to the information of association, and performs deletion of flow entries that are no longer used.

The terminal management unit 11 can be realized by a configuration that holds and manages a terminal management table that associates terminal identification information such as a MAC address or the like of the terminal T1 identification information of a switch node to which the terminal is connected, and a port number of the switch node, to be stored.

The terminal T1 of the present exemplary embodiment is a mobile terminal having a MAC address T1MA, and is connectable to at least the switch nodes SW1 and SW2.

The server S1 is connected to the switch node SW5, and is a server that provides a service in response to a request from various types of terminals including the terminal T1.

Next, a detailed description is given concerning operation of the present exemplary embodiment of the present invention, making reference to the drawings. Below, in the present exemplary embodiment, a description is given assuming a case where the terminal T1 communicates with the server S1, but the terminal T1 and the server S1 are examples for describing the present invention in an easily understood way, and pluralities of each thereof are also possible.

Figure 2:
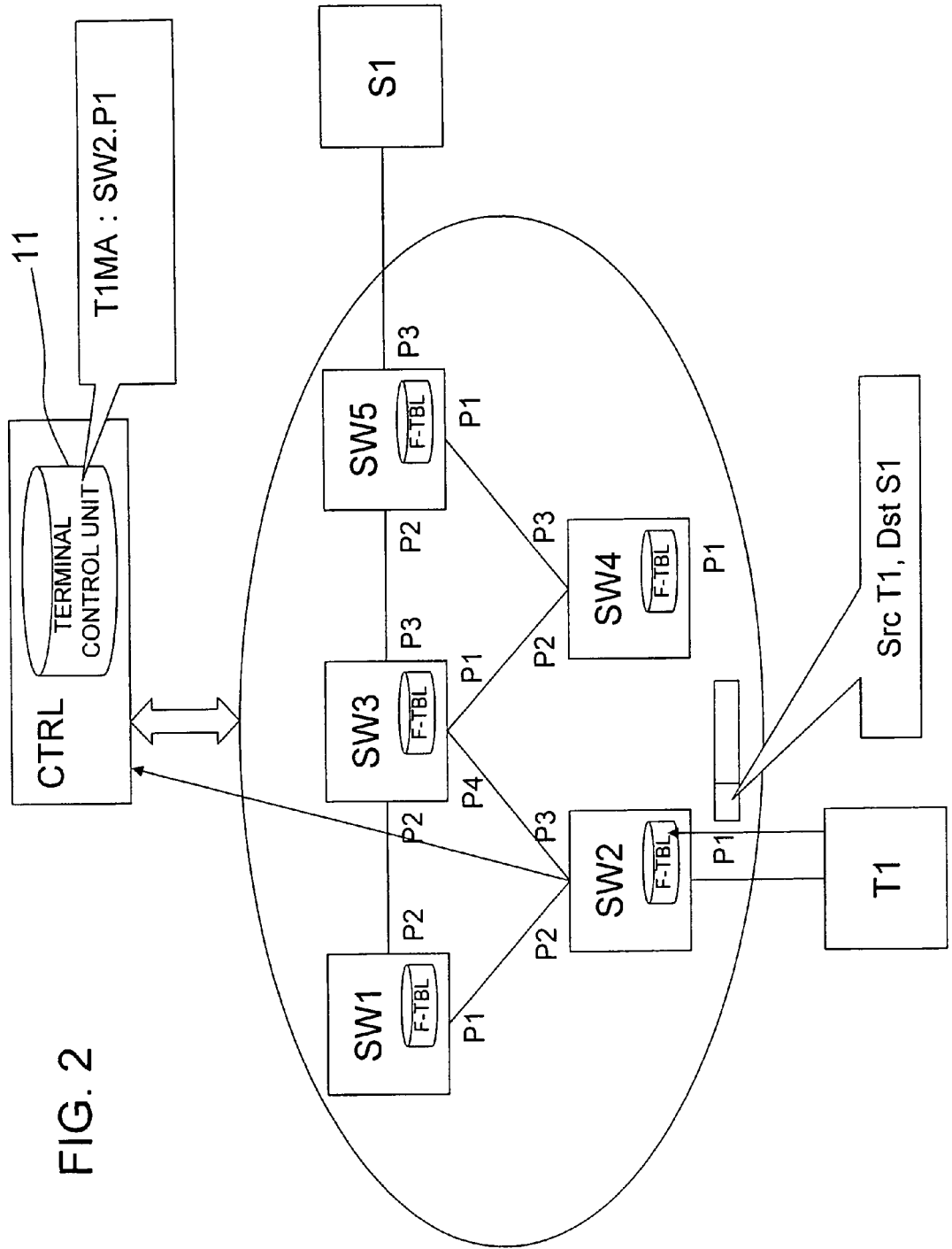
FIG. 2 is a diagram for describing operation of the communication system of the first exemplary embodiment of the present disclosure.

First, as shown in FIG. 2, the terminal T1 is connected to port P1 of SW2, and when a first packet is transmitted with S1 as a destination, the switch node SW2 conducts a search as to whether or not there is a flow entry matching the received packet in the flow table. Here, since there is no flow entry matching the received packet, the switch node SW2 requests the flow control device CTRL to create a forwarding path for the packet in question and to create a flow entry for realizing the forwarding path.

The flow control device CTRL, which receives the request to create the packet forwarding path and to create the flow entry, first refers to header information of the packet transmitted from the switch node SW2 and confirms whether or not the MAC address T1MA of the terminal T1, which is the source, is already recorded in the terminal management unit 11. As a result of the confirmation, if the MAC address T1MA of the terminal T1 is not recorded in the terminal management unit 11, the flow control device CTRL records information of association associating the MAC address T1MA of the terminal T1, identification information (here, this is "SW2") of the switch node, and an input port number thereof (here this is "P1" as shown in FIG. 2), as a new entry in the terminal management unit 11.

Here, the flow control device CTRL judges that it is possible to create a forwarding path for the packet transmitted from the switch node SW2, and creates a forwarding path for forwarding in the order of the switch node SW2, the switch node SW3, and the switch node SW5.

Figure 3:
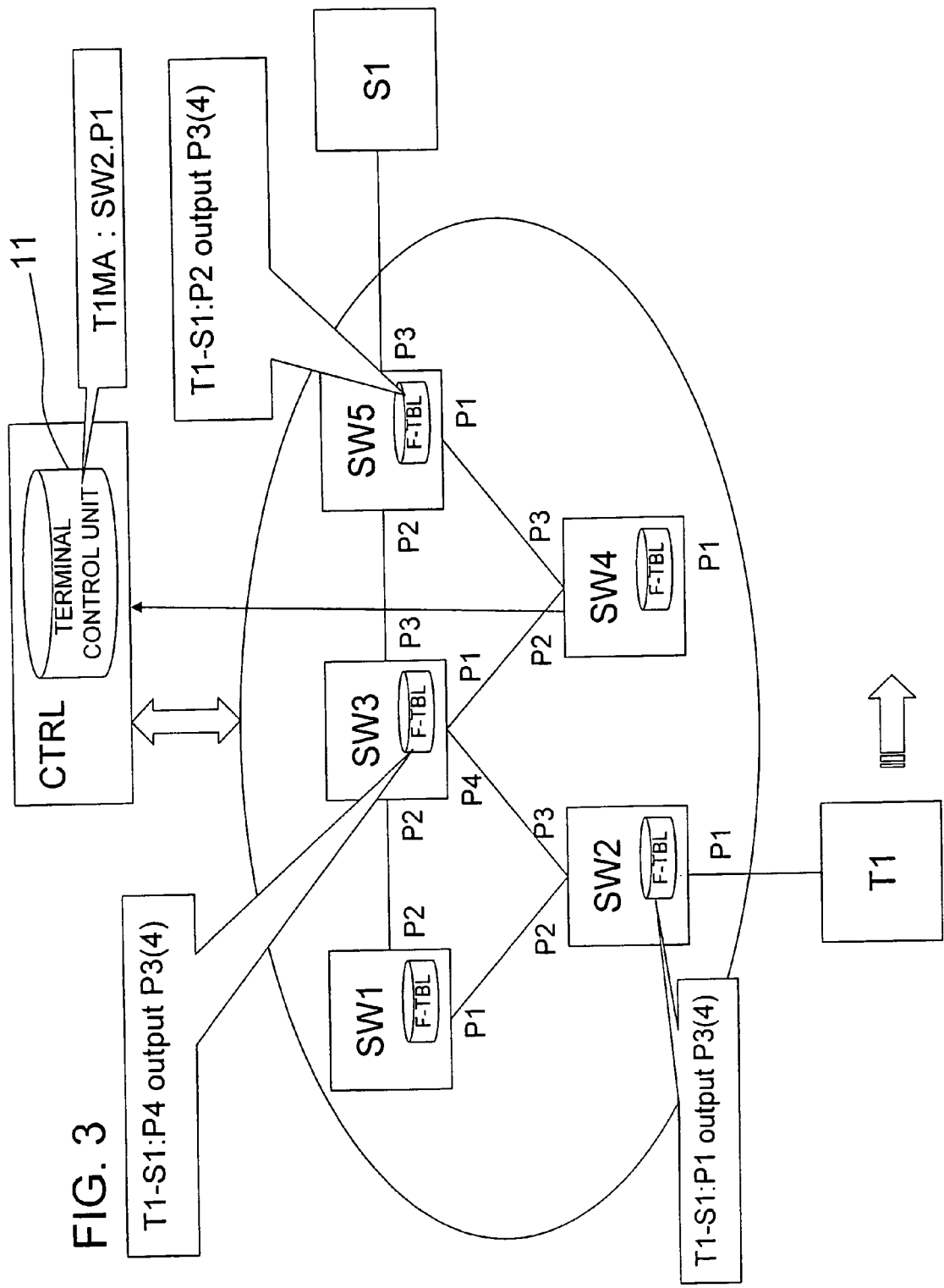
FIG. 3 is a continuation diagram of FIG. 2.

FIG. 3 shows a state where it is determined that a packet is not in the flow tables of the abovementioned switch nodes SW2, SW3, and SW5, and a flow entry for realizing a forwarding path that forwards in the order of the switch node SW2, the switch node SW3, and the switch node SW5, is added to the flow tables of each of the switch nodes by the flow control device CTRL.

In the example of FIG. 3, a flow entry of "T1-S1: P1 output P3(4)" is added to the switch node SW2. In this way, a packet having the terminal T1 as source, the server S1 as destination, and an input port as P1, is outputted from a port P3 of the switch node SW2. Since the port P3 of the switch node SW2 is connected to the switch node SW3, forwarding from the switch node SW2 to the switch node SW3 of the packet in question is realized by this flow entry. It is to be noted that numerical values inside parentheses indicate validity time (seconds) of the flow entry in question. For example, in a case where (4) is shown as in FIG. 2, if a matching packet is not received within 4 seconds, the flow entry in question is deleted.

Similarly for the switch node SW3 and the switch node SW5, a flow entry is added for forwarding the packet in question to the server S1 via the switch node SW5.

Figure 4:
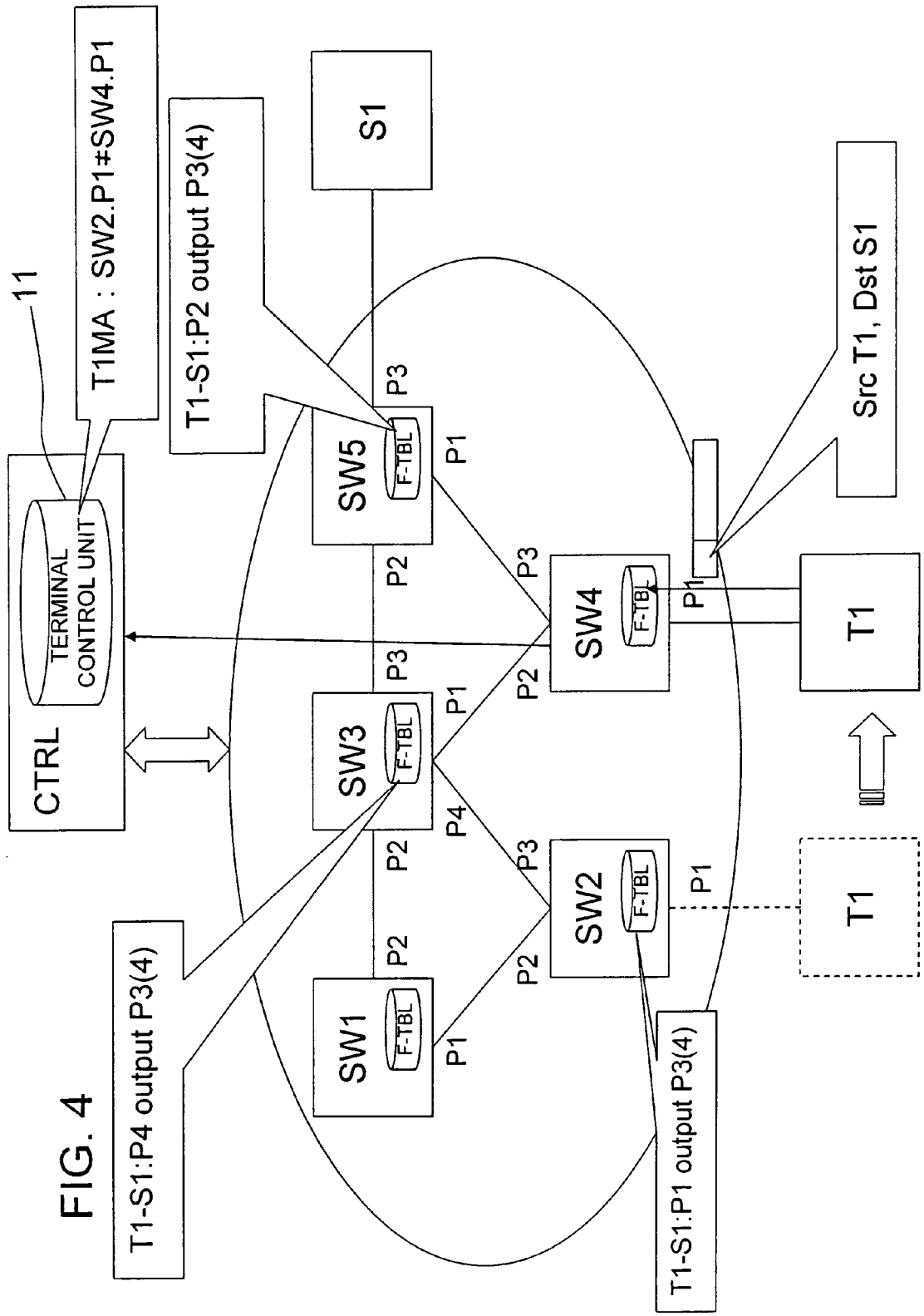
FIG. 4 is a continuation diagram of FIG. 3.

Thereafter, as shown in FIG. 4, a case is considered where the terminal T1 moves, connects to a port P1 of SW4, and forwards a packet with S1 as destination. In this case, the switch node SW4 conducts a search as to whether or not there is a flow entry matching the received packet in the flow table. Here, since there is no flow entry matching the received packet, the switch node SW4 requests the flow control device CTRL to create a forwarding path for the packet in question and to create a flow entry for realizing the forwarding path.

The flow control device CTRL, which receives the request to create the packet forwarding path and to create the flow entry, refers to header information of the packet transmitted from the switch node SW2, and confirms whether or not the MAC address T1MA of the terminal T1, which is the source, is already recorded in the terminal management unit 11. As a result of the confirmation, it is ascertained that the terminal T1 is currently connected to port P1 of the switch node SW2, that is, that the terminal T1 has moved (an old flow entry set in the terminal T1 is unnecessary).

Figure 5:
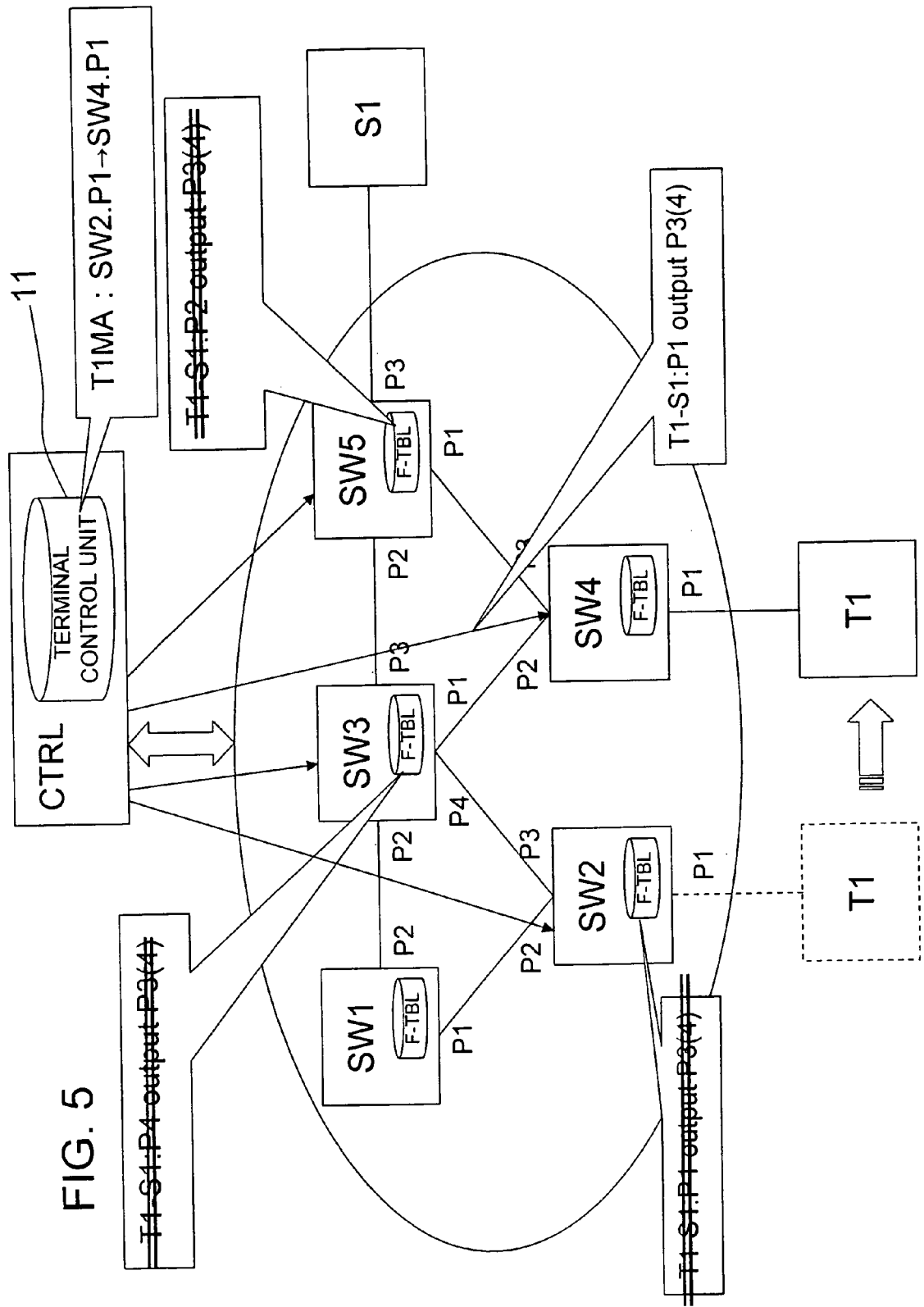
FIG. 5 is a continuation diagram of FIG. 4.
Figure 6:
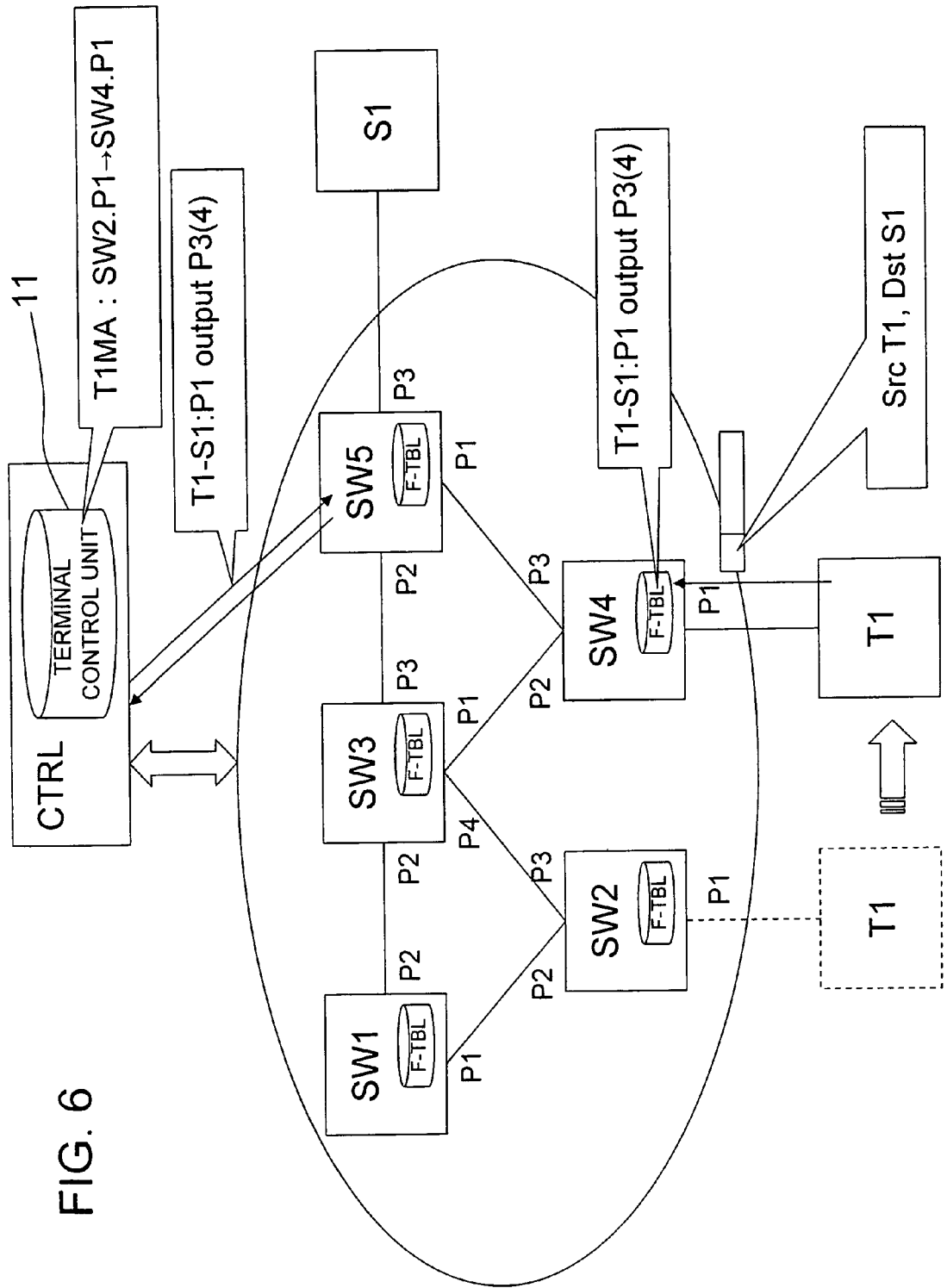
FIG. 6 is a continuation diagram of FIG. 5.

At this time, as shown in FIG. 5, the flow control device CTRL chances a connection destination of the terminal T1 held in the terminal management unit 11 from port P1 of the switch node SW2 to port P1 of the switch node SW4, and also instructs the switch node SW2, the switch node SW3, and the switch node SW5 to delete a flow entry associated with a path set previously.

Here, the flow control device CTRL judges that it is possible to create a forwarding path for the packet transmitted from the switch node SW4, and creates a forwarding path for forwarding in the order of the switch node SW4 and the switch node SW5.

At this time, the flow control device CTRL, as shown in FIG. 5, instructs the switch node SW4 to add a flow entry of "T1-S1: P1 output P3(4)". In this way, a packet having the terminal T1 as source, the server S1 as destination, and an input port as P1, is outputted from port P3 of the switch node SW4. Since the port P3 of the switch node SW4 is connected to the switch node SW5, forwarding of the packet From the switch node SW4 to the switch node SW5 is realized by this flow entry.

In the same way for the switch node SW5 also, an instruction is given for the addition of a flow entry of "T1-S1: P1 output P3(4)", which instructs forwarding of the packet in question to the server S1.

Figure 7:
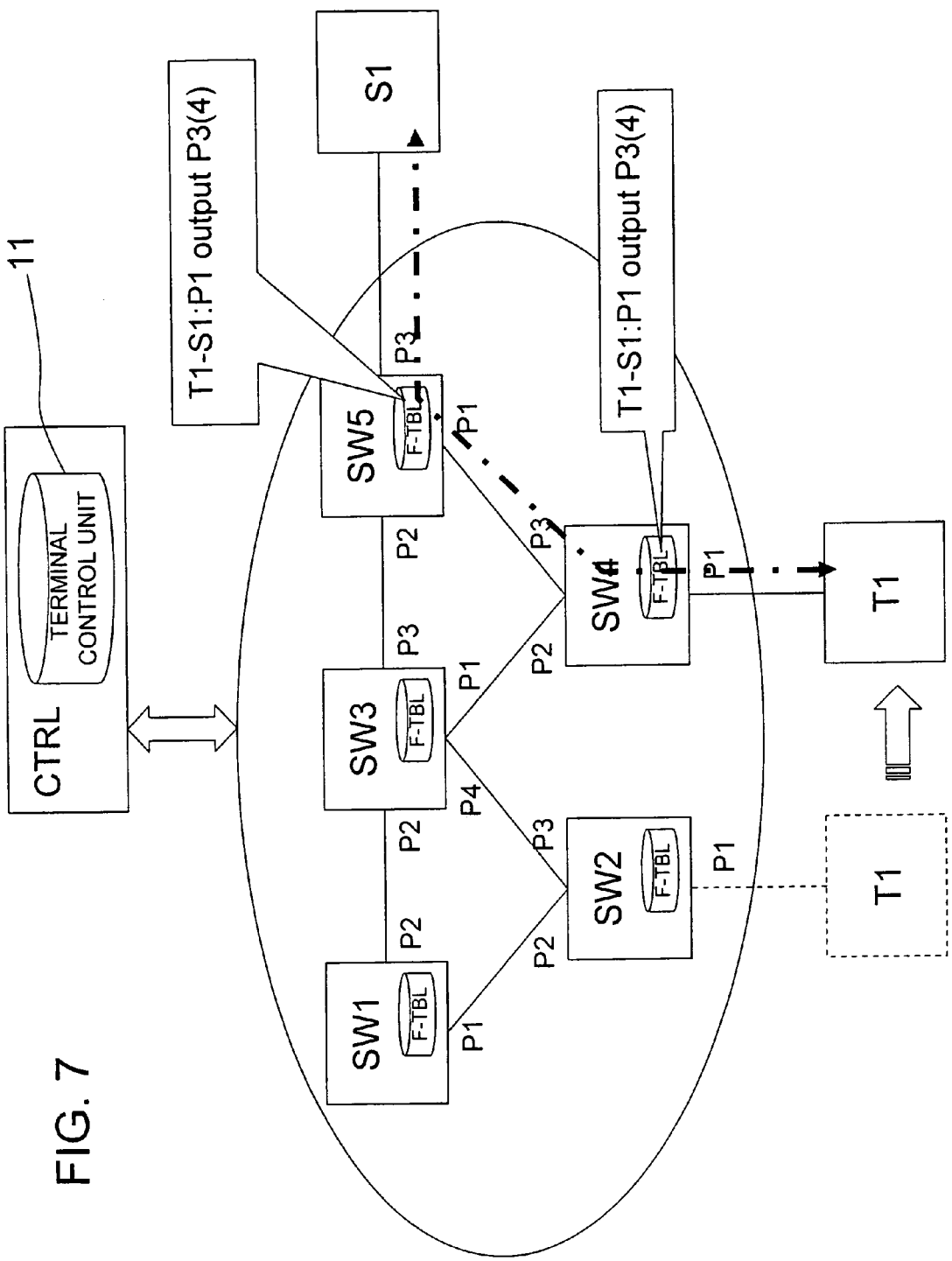
FIG. 7 is a continuation diagram of FIG. 6.
Figure 8:
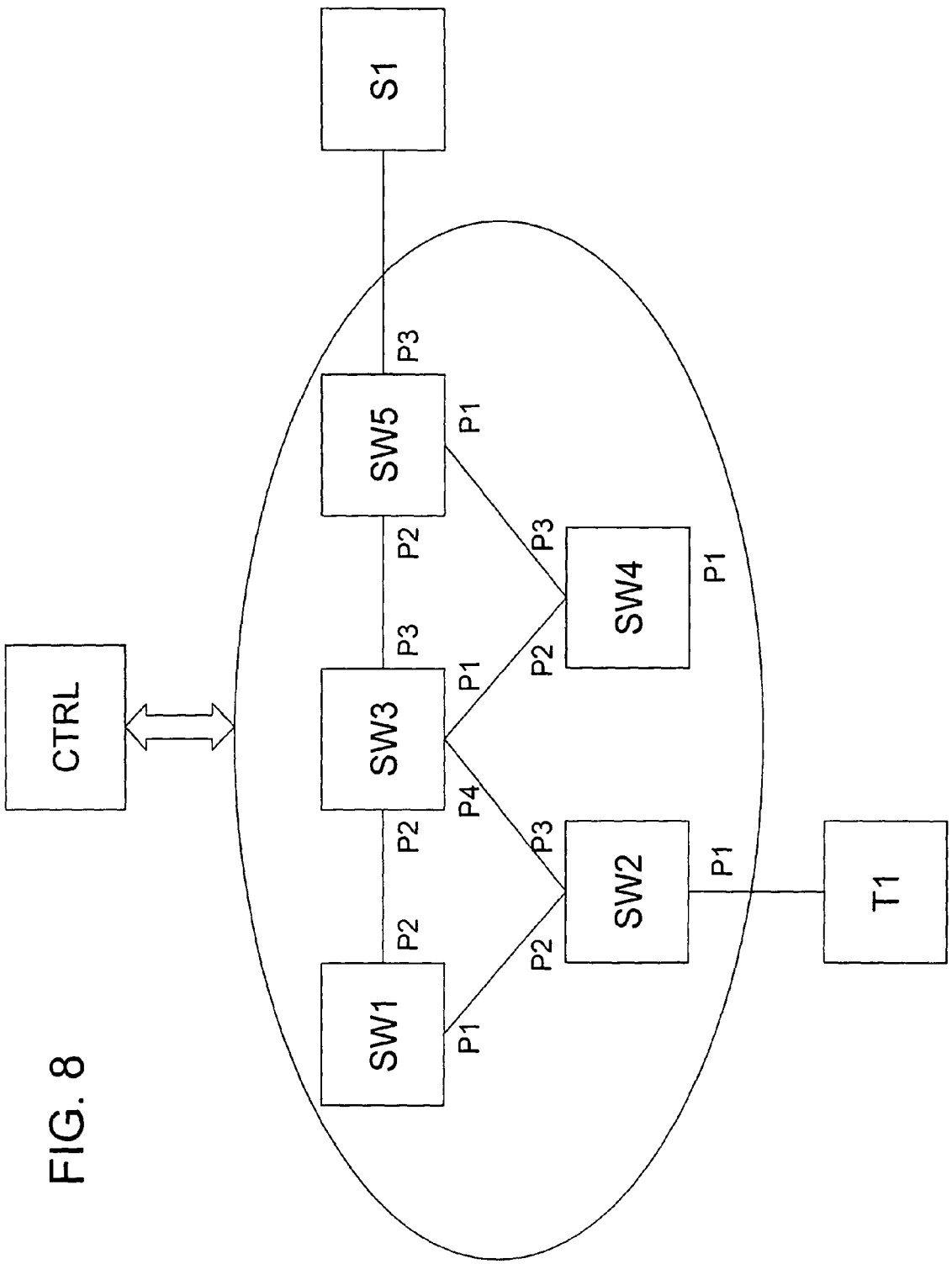
FIG. 8 is a diagram representing an outline configuration of a communication system disclosed in Non-Patent Document 1.
Figure 9:
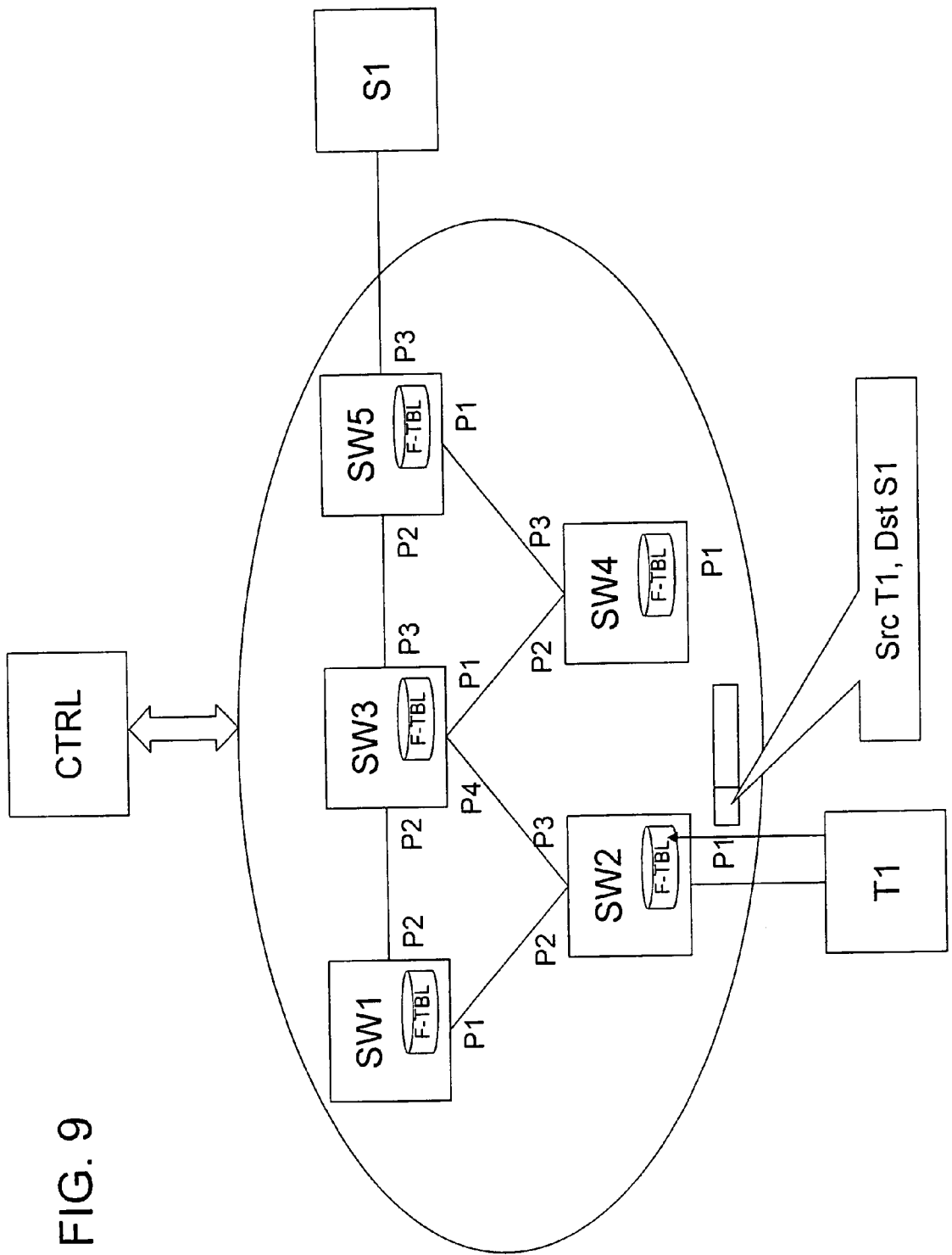
FIG. 9 is a diagram for describing an operation example of the communication system disclosed in Non-Patent Document 1.
Figure 10:
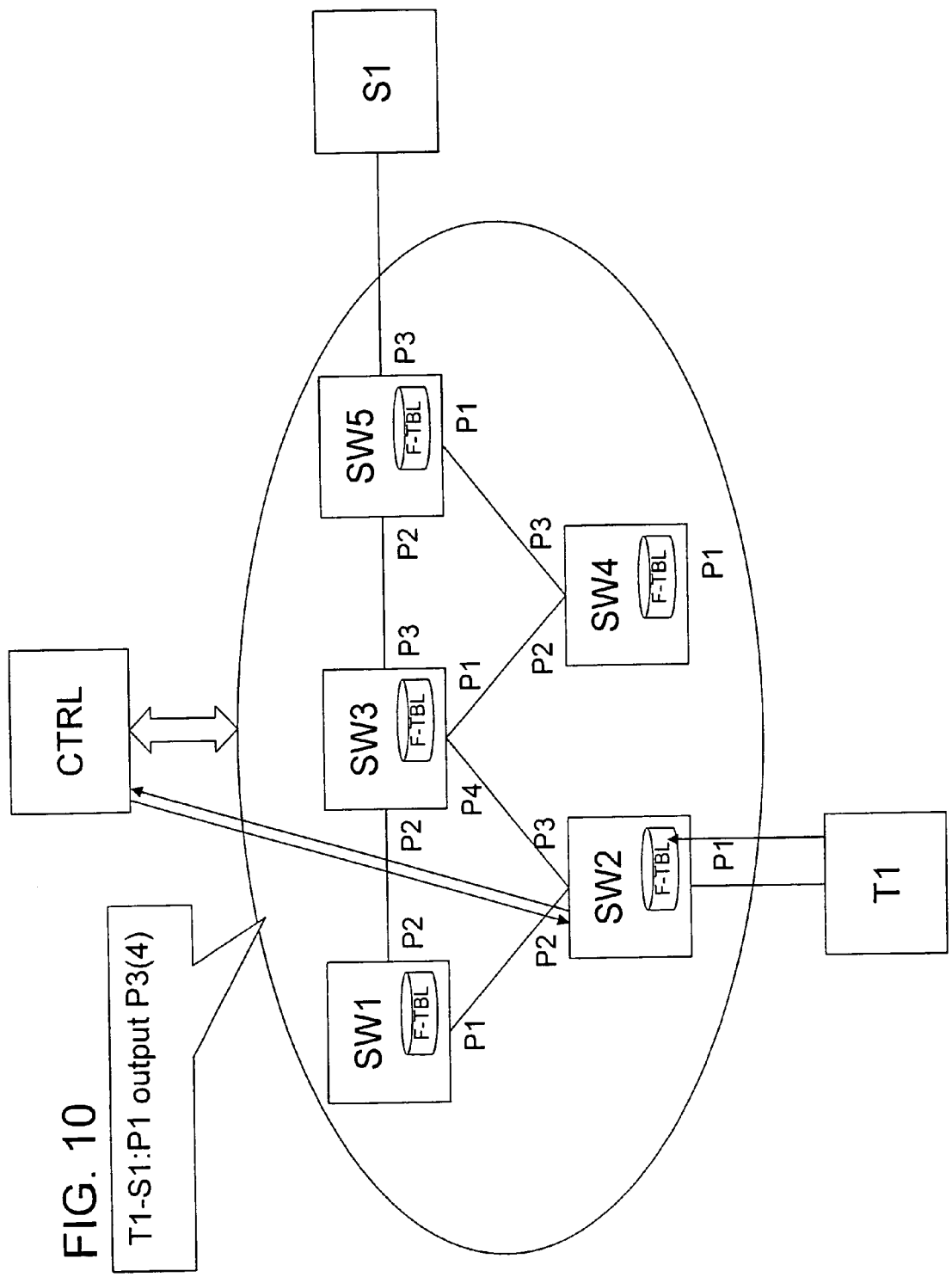
FIG. 10 is a continuation diagram of FIG. 9.
Figure 11:
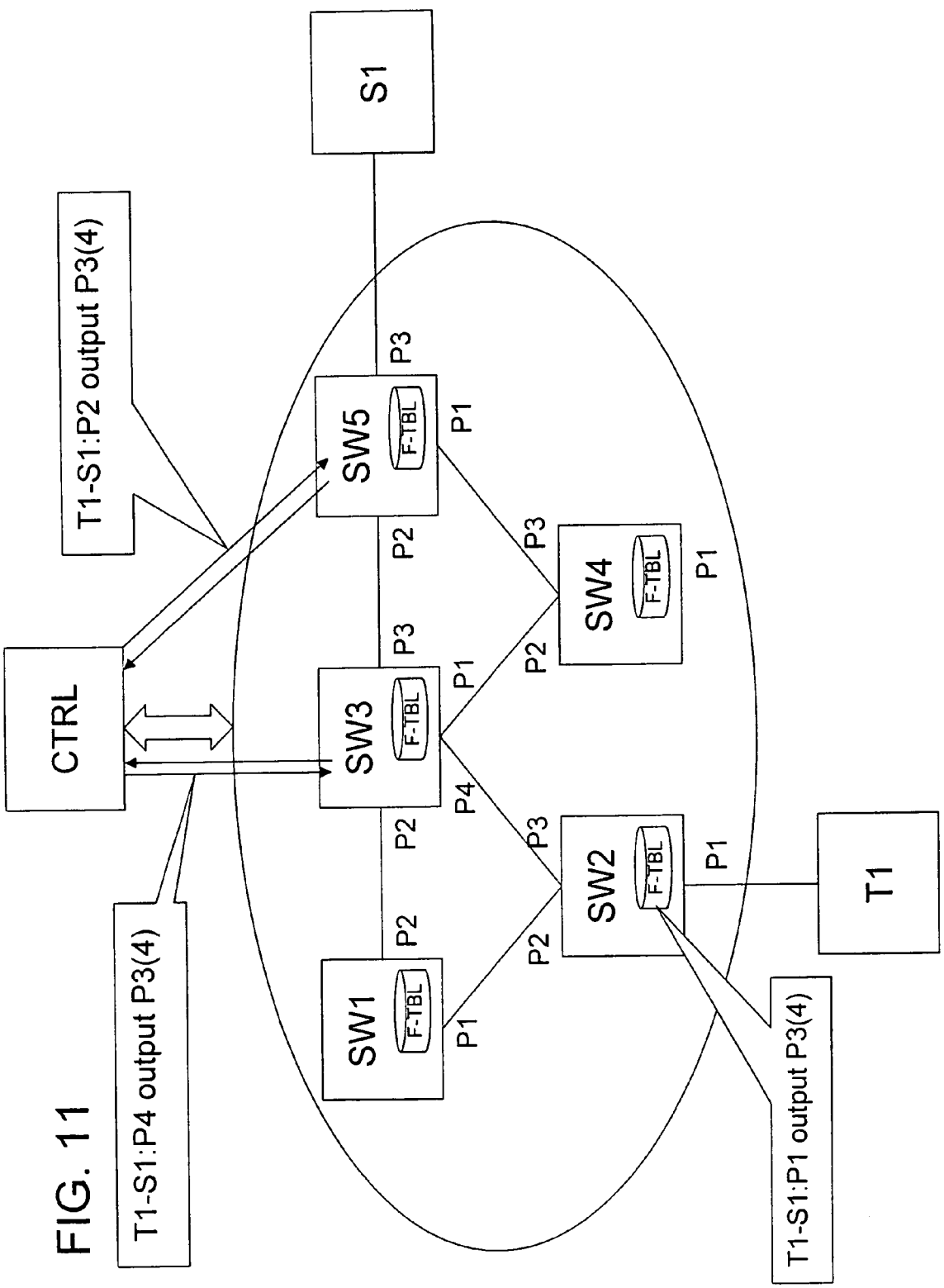
FIG. 11 is a continuation diagram of FIG. 10.
Figure 12:
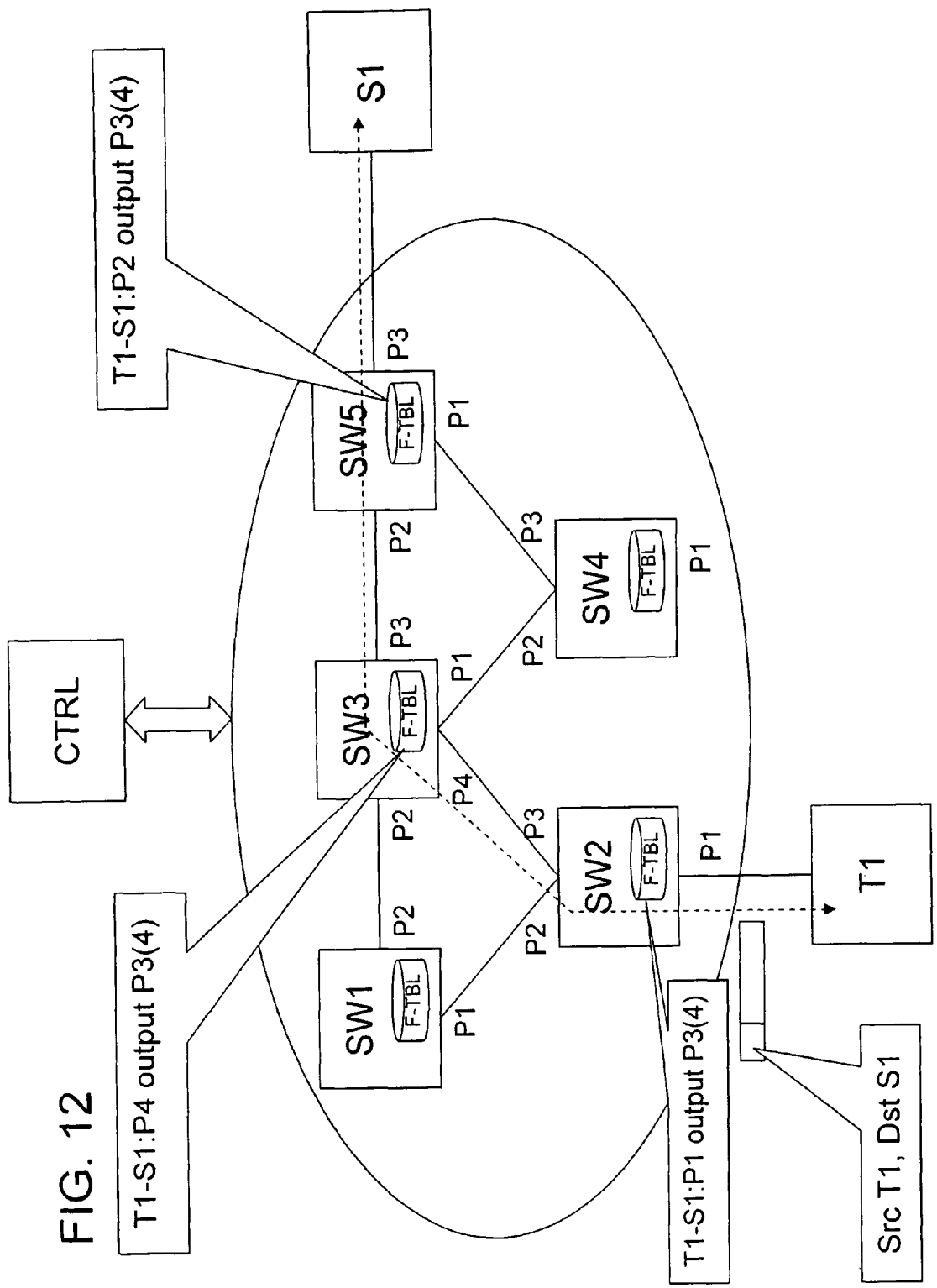
FIG. 12 is a continuation diagram of FIG. 11.
Figure 13:
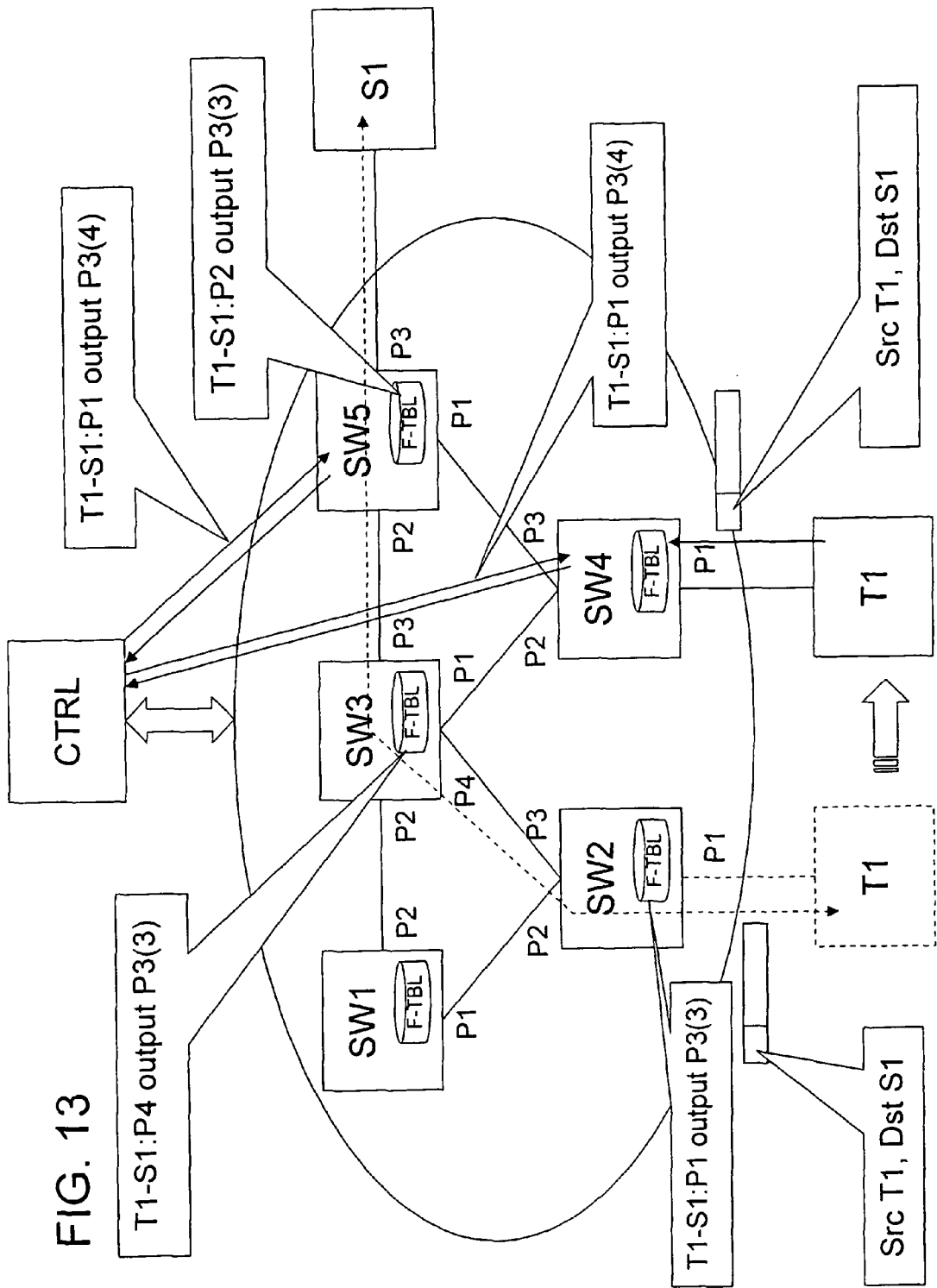
FIG. 13 is a continuation diagram of FIG. 12.

From the above, as shown in FIG. 7, the packet forwarding according to a path in the order of the switch node SW4, the switch node SW5, and the server S1, is realized. Furthermore, as in clear if FIG. 7 and FIG. 14 are compared, in the present exemplary embodiment it is possible to delete unnecessary flow entries in the switch node SW2, the switch node SW3, and the switch node SW5, without waiting for time to pass in accordance with a soft state.

A preferable exemplary embodiment of the present disclosure has been described above but the present invention is not limited to the abovementioned exemplary embodiment, and further modifications, substitutions, and adjustments can be added within a scope that does not depart from a fundamental technical principle of the present disclosure.

For example, in the abovementioned exemplary embodiment a description was given in which the flow control device CTRL issues an instruction for recording a new flow entry, after once deleting an old flow entry of the switch node SW5, but a method can also be adopted in which the flow entry is modified directly.

Furthermore, in the abovementioned exemplary embodiment, a description was given citing an example of a transition from a state where the terminal T1 is connected to the switch node SW2 to a state of being connected to the switch node SW4, but the generation of a state where an old flow entry may be deleted is not limited to movement of the terminal T1. For example, when there is a change of port of the switch node SW2 to which the terminal T1 is connected, in a case where it is ascertained that an old flow entry, which has been set with the terminal T1 connected, has become unnecessary according to information managed in the terminal management unit 11, it is possible to perform similar control.

Furthermore, the flow control device CTRL in the abovementioned exemplary embodiment can also be realized with a dedicated server having the terminal management unit 11. In addition, the switch nodes can also be realized, outside of the OpenFlow switch of Non-Patent Document 1, by a router in an IP network, or an MPLS switch in an MPLS network.

Otherwise, if a network is such that a server has central control of switch nodes within the network, it is possible to apply the present disclosure.

Industrial Applicability

The present disclosure as described above can be realized by only a change in the flow control device, and does not demand the addition of a function to an existing switch node, or an existing terminal, or server at a communication destination. Therefore, utilizing OpenFlow technology, preferable usage is possible in an application such as one for providing a communication service to a mobile terminal. It is to be noted that respective disclosures of the abovementioned patent documents and the like are incorporated herein by reference thereto. Modifications and adjustments of embodiments and examples are possible within the bounds of the entire disclosure (including the scope of the claims) of the present disclosure, and also based on fundamental technological concepts thereof. Furthermore, a wide variety of combinations and selections of various disclosed elements is possible within the scope of the claims of the present disclosure. That is, the present invention clearly includes every type of transformation and modification that a person skilled in the art can realize according to the entire disclosure including the scope of the claims and to technological concepts thereof.

In the following, preferred modes are summarized.

Mode 1

A communication system comprising: a switch node that operates in accordance with a flow table in which processing content is defined for each of a plurality of flows; and a flow control device that comprises a terminal management unit that records, based on a request to set a flow entry from the switch node, information of association between a terminal of a packet source and a switch node to which the terminal is connected; wherein the flow control device refers to the information of association to make the switch node execute a modification or deletion of a flow entry in the flow table.

Mode 2

The communication system according to mode 1, wherein, when a change is detected in a switch node to which a terminal is connected, the flow control device makes respective switch nodes delete a flow entry that has been set for the terminal.

Mode 3

The communication system according to mode 1 or 2, wherein the terminal management unit additionally makes an association in port information of connected switch nodes for respective terminals, to be stored, and when a change is detected in a port to which a terminal is connected, the flow control device makes each switch node delete a flow entry that has been set for the terminal.

Mode 4

The communication system according to any one of modes 1 to 3, wherein, when a change is detected in a port or a switch node to which a terminal is connected, the flow control device makes each switch node delete a flow entry that has been set for the terminal, and then instructs each of the switch nodes to add a new flow entry for the terminal.

Mode 5

A flow control device, connected to a switch node that operates in accordance with a flow table in which processing content is defined for each of a plurality of flows, the flow control device comprising: a terminal management unit that records, based on a request to set a flow entry from the switch node, information of association between a terminal of a packet source and a switch node to which the terminal is connected; wherein reference is made to the information of association to make the switch node execute a modification or deletion of a flow entry in the flow table.

Mode 6

The flow control device according to mode 5, wherein, when a change is detected in a switch node to which a terminal is connected, respective switch nodes are made to delete a flow entry that has been set for the terminal.

Mode 7

The flow control device according to mode 5 or 6, wherein the terminal management unit additionally makes an association in port information of connected switch nodes for respective terminals, to be stored, and when a change is detected in a port to which a terminal is connected, respective switch nodes are made to delete a flow entry that has been set for the terminal.

Mode 8

The flow control device according to any one of modes 5 to 7, wherein, when a change is detected in a port or a switch node to which a terminal is connected, after making each switch node delete a flow entry that has been set for the terminal, an instruction is given to each of the switch nodes to add a new flow entry for the terminal.

Mode 9

A flow table updating method in a communication system comprising a switch node that operates in accordance with a flow table in which processing content is defined for each of a plurality of flows, and a flow control device that controls a switch node by making the switch node update the flow table, the method comprising: recording, based on a request to set a flow entry from the switch node, information of association between a terminal of a packet source and a switch node to which the terminal is connected, and referring to the information of association to make the switch node execute a modification or deletion of a flow entry in the flow table.

Mode 10

The flow table updating method according to mode 9, wherein, when a change is detected in a port to which a terminal is connected, respective switch nodes are made to delete a flow entry that has been set for the terminal.

Mode 11

The flow table updating method according to mode 9 or 10, wherein, in the step of recording information of association between a terminal of a packet source and a switch node to which the terminal is connected based on a request to set a flow entry from the switch node, in addition, an association is made in port information of a switch node to which the terminal is connected, to be stored: and when a change is detected in a port to which a terminal is connected, respective switch nodes are made to delete a flow entry that has been set for the terminal.

Mode 12

The flow table updating method according to any one of modes 9 to 11, wherein, when a change is detected in a port or a switch node to which the terminal is connected, after making respective switch nodes delete a flow entry that has been set for the terminal, an instruction is given to each of the switch nodes to add a new flow entry for the terminal.

Mode 13

A program for a communication system that includes a switch node that operates in accordance with a flow table in which processing content is defined for each of a plurality of flows, and a flow control device that controls a switch node by making the switch node update the flow table, the program executing, in a computer comprising the flow control device, a process of recording, based on a request to set a flow entry from the switch node, information of association between a terminal of a packet source and a switch node to which the terminal is connected, and a process of referring to the information of association to instruct the switch node to execute a modification or deletion of a flow entry in the flow table.

Mode 14

The program according to mode 13, wherein, when a change is detected in a port to which a terminal is connected, respective switch nodes are instructed to delete a flow entry that has been set for the terminal.

Mode 15

The program according to mode 13 or 14, wherein, in the process of recording information of association between a terminal of a packet source and a switch node to which the terminal is connected based on a request to set a flow entry from the switch node, in addition, an association is made in port information of a switch node to which the terminal is connected, to be stored, and when a change is detected in a port to which a terminal is connected, respective switch nodes are instructed to delete a flow entry that has been set for the terminal.

EXPLANATIONS OF SYMBOLS

11 terminal management unit
S1 server
T1 terminal
SW1-SW5 switch nodes
P1-P4 ports

What is claimed is:

1. A communication system comprising:
   a switch node that operates in accordance with a flow table comprising a plurality of flow entries each of which defines an action field for processing a packet flow corresponding to said flow entry; and
   a flow control device that comprises a terminal management unit that records, based on a request to set said flow entry from said switch node, information of association between a terminal sending a packet and said switch node to which said terminal is connected,
   wherein said flow control device acknowledges a movement of said terminal by referring to header information of incoming packet from said switch node, detects that said terminal migrates to another switch node if an association between said migrated terminal and said another switch is not retrieved from said terminal management unit, and instructs said switch node from which said terminal migrates to modify or delete said flow entry corresponding to said migrated terminal.

2. The communication system according to claim 1, wherein, when a change is detected in a switch node to which a terminal is connected, said flow control device makes respective switch nodes delete a flow entry that has been set for said terminal.

3. The communication system according to claim 1, wherein:
   said terminal management unit additionally makes an association in port information of connected switch nodes for respective terminals, to be stored, and
   when a change is detected in a port to which a terminal is connected, said flow control device makes each switch node delete a flow entry that has been set for said terminal.

4. The communication system according to claim 1, wherein, when a change is detected in a port or a switch node to which a terminal is connected, said flow control device makes each switch node delete a flow entry that has been set for said terminal, and then instructs each of said switch nodes to add a new flow entry for said terminal.

5. The communication system according to claim 1, wherein the terminal management unit comprises a non-transitory computer recordable medium that records, based on the request to set the flow entry from said switch node, information of association between the terminal of the packet source and the switch node to which said terminal is connected.

6. The communication system according to claim 1, wherein:
said flow control device acknowledges a movement of said terminal by confirming whether or not said terminal has been recorded in said terminal management unit, and
as a result of confirmation, it is determined that the terminal is currently connected to a port of the switch node.

7. A flow control device, connected to a switch node that operates in accordance with a flow table comprising a plurality of flow entries each of which defines an action field for processing a packet flow corresponding to said flow entry, said flow control device comprising:
a terminal management unit that records, based on a request to set said flow entry from said switch node, information of association between a terminal sending a packet and a switch node to which said terminal is connected;
wherein said flow control device acknowledges a movement of said terminal by referring to header information of incoming packet from said switch node, detects that said terminal migrates to another switch node if an association between said migrated terminal and said another switch is not retrieved from said terminal management unit, and instructs said switch node from which said terminal migrates to modify or delete said flow entry corresponding to said migrated terminal.

8. The flow control device according to claim 7, wherein, when a change is detected in a switch node to which a terminal is connected, respective switch nodes are made to delete a flow entry that has been set for said terminal.

9. The flow control device according to claim 7, wherein:
said terminal management unit additionally makes an association in port information of connected switch nodes for respective terminals, to be stored, and
when a change is detected in a port to which a terminal is connected, respective switch nodes are made to delete a flow entry that has been set for said terminal.

10. The flow control device according to claim 7, wherein, when a change is detected in a port or a switch node to which a terminal is connected, after making each switch node delete a flow entry that has been set for said terminal, an instruction is given to each of said switch nodes to add a new flow entry for said terminal.

11. The flow control device according to claim 7, wherein the terminal management unit comprises a non-transitory computer recordable medium that records, based on the request to set the flow entry from said switch node, information of association between the terminal of the packet source and the switch node to which said terminal is connected.

12. A flow table updating method in a communication system comprising a switch node that operates in accordance with a flow table comprising a plurality of flow entries each of which defines an action field for processing a packet flow corresponding to said flow entry, and a flow control device that controls a switch node by making said switch node update said flow table, said method comprising:
recording, by a terminal management unit, based on a request to set said flow entry from said switch node, information of association between a terminal sending a packet and said switch node to which said terminal is connected;
acknowledging a movement of said terminal by referring to header information of incoming packet from said switch node;
detecting that said terminal migrates to another switch node if an association between said migrated terminal and said another switch is not retrieved from said terminal management unit; and
instructing said switch node from which said terminal migrates to modify or delete said flow entry corresponding to said migrated terminal.

13. The flow table updating method according to claim 12, wherein, when a change is detected in a port to which a terminal is connected, respective switch nodes are made to delete a flow entry that has been set for said terminal.

14. The flow table updating method according to claim 12, wherein, in said recording information of association between a terminal of a packet source and a switch node to which said terminal is connected based on a request to set a flow entry from said switch node, in addition, an association is made in port information of a switch node to which said terminal is connected, to be stored, and
when a change is detected in a port to which a terminal is connected, respective switch nodes are made to delete a flow entry that has been set for said terminal.

15. The flow table updating method according to claim 12, wherein, when a change is detected in a port or a switch node to which said terminal is connected, after making respective switch nodes delete a flow entry that has been set for said terminal, an instruction is given to each of said switch nodes to add a new flow entry for said terminal.

* * * * *